May 19, 1959 — M. HUGUENIN — 2,886,943

BEARING FOR TIMEPIECE

Filed Oct. 1, 1956

INVENTOR:
Marc HUGUENIN
By John ...
Attorney

United States Patent Office 2,886,943  
Patented May 19, 1959

2,886,943
BEARING FOR TIMEPIECE

Marc Huguenin, Geneva, Switzerland, assignor to Montres Rolex S.A., Geneva, Switzerland, a Swiss firm Application October 1, 1956, Serial No. 613,005

Claims priority, application Switzerland October 7, 1955

6 Claims. (Cl. 58—140)

The present invention relates to a bearing for timepiece.

This bearing is characterized by the fact that an annular capillary space, intended to contain a reserve of oil, is provided between the end piece of the bearing and its support, this space opening into the outside of the bearing and communicating, through capillary passages, with the space situated between the end piece and the jewel.

The annexed drawing shows, by way of example, one embodiment of the object of the invention.

Figure 1:
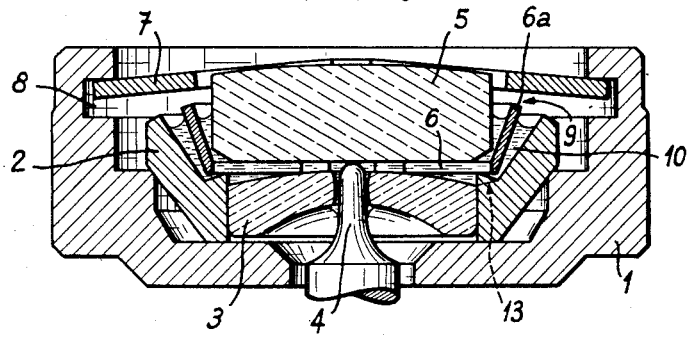
Fig. 1 is an axial sectional view of a shock damping bearing for the balance staff of a timepiece.
Figure 2:
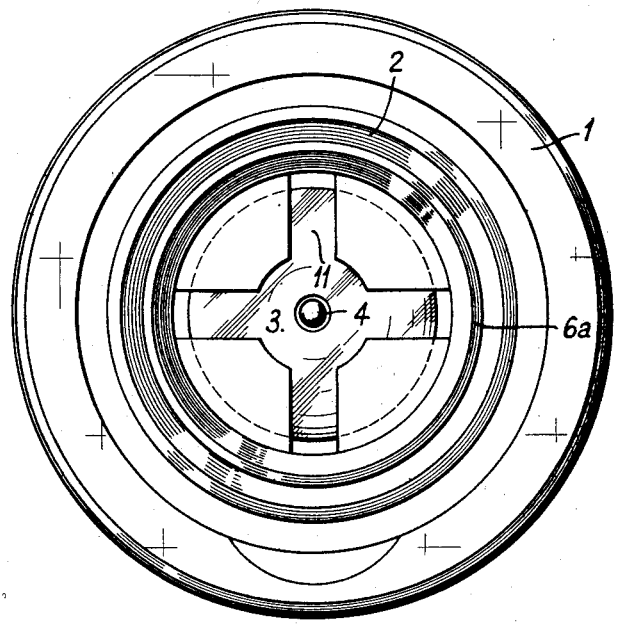
Fig. 2 is a plane view of this bearing, the damping spring and the cap jewel having been removed.
Figure 3:
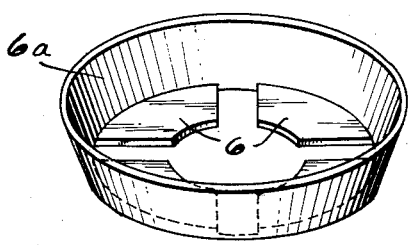
Fig. 3 is a perspective view of a detail.

The bearing represented comprises a frame 1 intended to be forced into the base plate or into the balance cock, not represented, of a clockwork. This frame encloses a support 2 in which is forced a jewel hole 3 traversed by the end of a balance staff 4. A cap jewel 5 rests in the support 2, with interposition of an annular disk 6. A return spring 7 is anchored in an inner groove 8 of the frame 1 and bears on the cap jewel. When the balance staff 4 is submitted to shocks, the support 2 is moved with the two jewels, constituting a whole, against the action of the spring 7. Only the shocks which are perfectly axial displace the cap jewel alone.

An annular space 9, of a V-shaped across section, intended to contain a reserve of oil 10, is provided between the cap jewel 5 and the support 2. Owing to lateral apertures 11 provided in the disk 6, this space communicates with the space situated between the two jewels. In order to hold in place the oil situated in the annular space 9, this space is divided into two spaces by a frusto-conical wall 6a made of one piece with the disk 6. These two spaces are of V-shaped cross section and communicate both with the space situated between the two jewels.

It is to be noted that the annular space 9 constituting an oil holder opens into the outside of the bearing, so that it is possible to add oil without having to remove the bearing.

Instead of bearing on an annular disk, as is the case in the embodiment disclosed and represented, the cap jewel could rest directly on the support; in this case, the capillary passages for oil bringing into connection the annular space with the space situated between the two jewels, could be provided in the support itself, as indicated by the dotted line 13 of Fig. 1 for instance. The cap jewel could be also be provided with a setting in which these capillary passages could be provided; the end piece of the bearing would then be constituted by the cap jewel and its setting, the annular space being provided between this latter and the support.

At last, the present invention is not restricted to shock damping bearings, but could be applied to stationary bearings, for instance by providing in the setting of the cap jewel as well the annular space opening into the outside as the capillary passages for the oil.

What I claim is:

1. In a bearing for timepiece, an end piece, a hole jewel located at a distance from said end piece whereby a space is provided between them, a support for the end piece providing therewith an annular capillary space opening into the outside of the bearing and intended to contain a reserve of oil, and capillary passages bringing said annular space into communication with the space situated between the end piece and the hole jewel.

2. In a shock absorbing bearing for timepiece of the type in which the hole jewel and the end piece are both mounted in a common movable support, the feature that a space is provided between said end piece and said jewel hole, that an annular capillary space intended to contain a reserve of oil is provided between said end piece and said movable support, this annular space opening into the outside of the bearing, and that capillary passages bring said annular space into communication with the space situated between the end piece and the hole jewel.

3. In a bearing for timepiece, an end piece, a hole jewel located at a distance from said end piece whereby a space is provided between them, a support for this end piece providing therewith an annular capillary space of a V-shaped cross-section opening into the outside of the bearing and intended to contain a reserve of oil, and capillary passages bringing said annular space into communication with the space situated between the end piece and the hole jewel.

4. In a bearing for timepiece, an end piece, a hole jewel located at a distance from said end piece whereby a space is provided between them, a support for this end piece providing therewith an annular capillary space of a V-shaped cross-section opening into the outside of the bearing and intended to contain a reserve of oil, a frusto-conical wall dividing said annular space in two spaces each of a V-shaped cross-section, and capillary passages bringing said two spaces into communication with the space situated between the end piece and the hole jewel.

5. In a bearing for timepiece, an end piece, a hole jewel located at a distance from said end piece whereby a space is provided between them, a support for this end piece providing therewith an annular capillary space of a V-shaped cross-section opening into the outside of the bearing and intended to contain a reserve of oil, a frusto-conical wall dividing said annular space in two spaces each of a V-shaped cross-section, and a radial disk-shaped extension of said wall, provided with a central hole, located between the end piece and the jewel hole, and capillary apertures bringing said two spaces into communication with the space situated between the end piece and the hole jewel.

6. In a bearing for timepiece, an end piece, a hole jewel located at a distance from said end piece whereby a space is provided between them, a support for this end piece providing therewith an annular capillary space opening into the outside of the bearing and intended to contain a reserve of oil, and capillary passages provided in said support for bringing said annular space into communication with the space situated between the end piece and the hole jewel.

References Cited in the file of this patent

UNITED STATES PATENTS

| 2,671,309 | Marti | Mar. 9, 1954 |

FOREIGN PATENTS

| 281,193 | Switzerland | June 3, 1952 |
| 1,049,614 | France | Aug. 19, 1953 |
| 295,739 | Switzerland | Mar. 16, 1954 |
| 296,395 | Switzerland | Apr. 17, 1954 |